United States Patent
Dang et al.

(10) Patent No.: US 8,861,375 B2
(45) Date of Patent: *Oct. 14, 2014

(54) SELF-HEALING FIBRE CHANNEL LINK

(71) Applicant: International Business Machines Corporation, Armonk, NY (US)

(72) Inventors: Dung Ngoc Dang, Seattle, WA (US); Daniel W. Fok, Tucson, AZ (US); Steven Edward Klein, Tucson, AZ (US); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,910

(22) Filed: Jun. 14, 2013

(65) Prior Publication Data
US 2013/0279898 A1    Oct. 24, 2013

Related U.S. Application Data

(63) Continuation of application No. 12/561,114, filed on Sep. 16, 2009, now Pat. No. 8,483,071.

(51) Int. Cl.
*H04L 12/26* (2006.01)
*G01R 31/08* (2006.01)
*H04B 10/03* (2013.01)

(52) U.S. Cl.
CPC ............... *H04B 10/03* (2013.01); *H04L 12/26* (2013.01)
USPC .......................................... 370/242; 370/216

(58) Field of Classification Search
CPC .................... H04J 3/14; H04L 43/50
USPC ............................................. 370/242, 216
See application file for complete search history.

(56) References Cited

U.S. PATENT DOCUMENTS

| | | | |
|---|---|---|---|
| 5,838,899 A | 11/1998 | Leavitt et al. | |
| 6,614,756 B1 * | 9/2003 | Morgenstern et al. | 370/230 |
| 6,658,540 B1 * | 12/2003 | Sicola et al. | 711/162 |
| 7,055,059 B2 * | 5/2006 | Yanai et al. | 714/6.32 |
| 8,218,740 B2 * | 7/2012 | Yeh et al. | 379/114.08 |
| 2003/0126107 A1 * | 7/2003 | Yamagami | 707/1 |
| 2005/0243712 A1 * | 11/2005 | MacKinnon et al. | 370/216 |
| 2006/0075148 A1 * | 4/2006 | Osaki | 710/5 |
| 2007/0248020 A1 | 10/2007 | Hoque et al. | |
| 2007/0294493 A1 * | 12/2007 | Buah et al. | 711/156 |
| 2008/0310443 A1 * | 12/2008 | Gage | 370/431 |
| 2009/0094483 A1 * | 4/2009 | Bai et al. | 714/15 |

* cited by examiner

*Primary Examiner* — Mark Rinehart
*Assistant Examiner* — Angel Brockman
(74) *Attorney, Agent, or Firm* — Nelson and Nelson; Daniel P. Nelson; Alexis V. Nelson (57) ABSTRACT

A method for verifying the integrity of a communication link is disclosed herein. In selected embodiments, such a method may include detecting, during normal operation of a communication link, a condition indicative of a high failure rate (HFR) on the communication link. The method may further include placing the communication link in an HFR state as a result of the condition. While in HFR state, the method may repeatedly transmit test I/Os over the communication link. The method may then automatically exit HFR state and resume normal operation on the communication link when one or more of the following has occurred: a selected number of test I/Os have been successfully transmitted over the communication link, and a number of test I/Os have been successfully transmitted over the communication link for a selected period of time. A corresponding system, apparatus, and computer program product are also disclosed and claimed herein.

20 Claims, 9 Drawing Sheets

SELF-HEALING FIBRE CHANNEL LINK

BACKGROUND

1. Field of the Invention

This invention relates to networking technology, and more particularly to apparatus and methods for verifying link integrity in fibre channel networks.

2. Background of the Invention

Peer to Peer Remote Copy (PPRC) is a protocol used to replicate a primary storage volume to a secondary storage volume located at a remote site. "Synchronous" PPRC is a configuration wherein each write to the primary storage device is also performed to a secondary storage device. In this scheme, an I/O is only considered complete when the I/O has successfully completed to both primary and secondary storage devices.

When transferring data between primary and secondary storage devices, problems may occur that will cause data transfers to time out. A timeout occurs when the primary storage device sends an I/O command to the secondary storage device but does not receive an acknowledgement signal within a specified period of time. When a timeout occurs, the primary storage device can retry the operation in an attempt to successfully redrive the I/O. When timeouts do occur, they can cause significant performance impacts on a host system that is writing to the primary storage device.

Timeouts may occur for a variety of reasons. They may be the result of transient failures (which may recover quickly without user intervention) or more persistent failures. Transient failures may be the result of network issues such as low bandwidth or latency caused by workload spikes, congestion in a fibre channel network, or temporary slowdowns on a PPRC secondary storage device. More persistent failures may be the result of physical problems on a fibre channel link (e.g., bad cables), hardware problems (e.g., faulty optics), or connection issues along the path (e.g., loose plugs).

There are several known solutions for paths experiencing timeouts. For example, the primary storage device could do nothing and keep sending PPRC I/O down a path that has been experiencing timeouts. This solution may work if the problem is transient in nature. One drawback to this solution is that if the path continues to experience timeouts, the host system will continue to be impacted. Another solution is to stop using the path altogether. This solution may be effective if more paths are available. A drawback to this approach is that a transient failure may cause a path that is otherwise functioning correctly to become unusable. If all paths experience such transient failures, I/O may unnecessarily suspend between the primary and secondary storage devices.

Yet another solution is to configure the primary storage device to report problems to a user while continuing to transmit I/O over the path. This solution relies on the user to take corrective action. However, if the user does not respond quickly and the path is experiencing more persistent failures, the host system will continue to be impacted by the timeouts. Yet another solution is to implement a throttling mechanism to reduce the amount of I/O that is transmitted over a failing path until the path stops experiencing timeouts. The primary storage device may then resume sending a normal amount of I/O. This may reduce the impact on the host system because it will reduce the amount of I/O that will be affected by timeouts. However, timeouts that do occur will still undesirably impact the host system.

Yet another solution is for the primary storage device to periodically "ping" the secondary storage device with a special command (e.g., a fibre channel link service or FCP command). If the pings are successful over a period of time, the primary storage device could resume normal I/O operations. This may be effective if failures on a link are very consistent. However, if link failures are random or inconsistent, there is a good chance that a "ping" would complete successfully, whereas a data transfer would fail. Therefore, this solution also has drawbacks.

In view of the foregoing, what is needed is a self-healing solution that can stop sending I/O down a path that experiences failures or timeouts, while also determining whether failures or timeouts on the path are transient. If the failures are transient, the solution would ideally be able to resume normal I/O on the path when the failures or timeouts end or subside.

SUMMARY

The invention has been developed in response to the present state of the art and, in particular, in response to the problems and needs in the art that have not yet been fully solved by currently available apparatus and methods. Accordingly, the invention has been developed to provide apparatus and methods for verifying the integrity of a communication link such as a fibre channel communication link. The features and advantages of the invention will become more fully apparent from the following description and appended claims, or may be learned by practice of the invention as set forth hereinafter.

Consistent with the foregoing, a method for verifying the integrity of a communication link is disclosed herein. In selected embodiments, such a method may include detecting, during normal operation of a communication link, a condition indicative of a high failure rate (HFR) on the communication link. The method may further include placing the communication link in an HFR state as a result of the condition. While in HFR state, the method may repeatedly transmit test I/Os over the communication link. The method may then automatically exit HFR state and resume normal operation on the communication link when one or more of the following has occurred: a selected number of test I/Os have been successfully transmitted over the communication link, and a number of test I/Os have been successfully transmitted over the communication link for a selected period of time. A corresponding system, apparatus, and computer program product are also disclosed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer-program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable medium embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages.

The present invention may be described below with reference to flowchart illustrations and/or block diagrams of methods, apparatus, systems, and computer-usable mediums according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
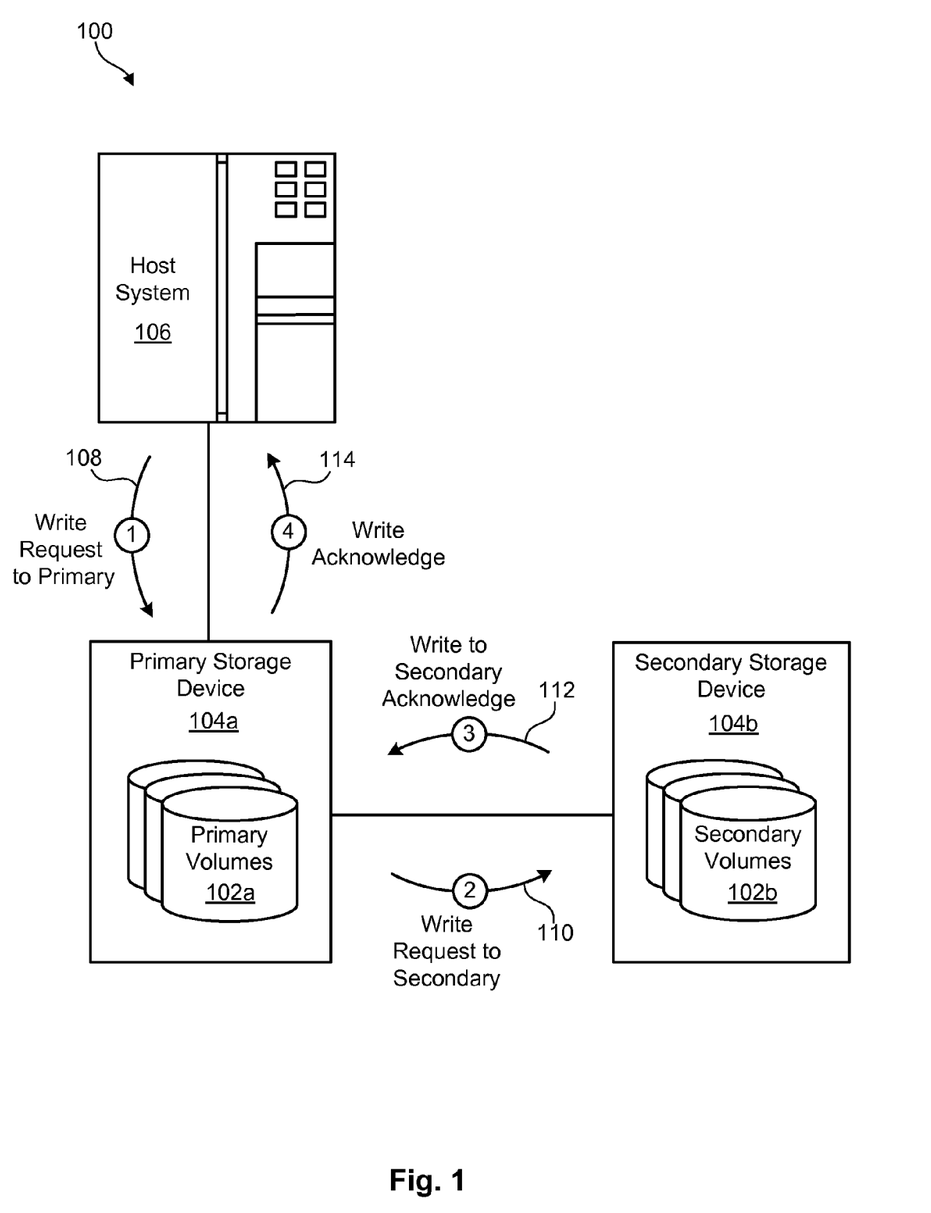
FIG. 1 is a high-level block diagram showing one example of a PPRC system.

Referring to FIG. 1, one embodiment of a PPRC system 100 (also known as a "Metro Mirror" system 100) is shown. The PPRC system 100 is presented only by way of example to show an architecture on which embodiments of the invention might operate and is not intended to be limiting. In general, the PPRC system 100 establishes a mirroring relationship between one or more primary volumes 102a and one or more secondary volumes 102b. Once this relationship is established, the volumes 102a, 102b may be updated substantially simultaneously. The primary and secondary volumes 102a, 102b may be located on the same storage device 104, although the volumes 102a, 102b are typically located on separate storage devices 104a, 104b (i.e., primary and secondary storage devices 104a, 104b) located some distance (e.g., several miles to several hundreds of miles) from one another. Channel extension equipment may be located between the storage devices 104a, 104b, as needed, to extend the distance over which the storage devices 104a, 104b may communicate.

The PPRC system 100 may, in certain embodiments, be configured to operate in a synchronous manner. In this configuration, an I/O is only considered complete when the I/O has successfully completed to both the primary and secondary storage devices 104a, 104b. As an example, in such a configuration, a host system 106 may initially send a write request 108 to the primary storage device 104a. This write operation 108 may be performed on the primary storage device 104a and the primary storage device 104a may, in turn, transmit a write request 110 to the secondary storage device 104b. The secondary storage device 104b may execute the write operation 110 and return a write acknowledge signal 112 to the primary storage device 104a. Once the write has been performed on both the primary and secondary storage devices 104a, 104b, the primary storage device 104a may return a write acknowledge signal 114 to the host system 106. Thus, in this configuration, the host system 106 must wait for the write to be performed on both the primary and secondary storage devices 104a, 104b before it receives an acknowledge signal 114.

One advantage of a PPRC system 100 like that illustrated in FIG. 1 is that the PPRC functionality may be application independent. That is, the PPRC functionality may be contained exclusively within the storage devices 104a, 104b. The host system's operating system and applications may have no knowledge of the PPRC relationship between the primary and secondary volumes 102a, 102b.

Although the apparatus and methods disclosed herein will be discussed primarily in association with synchronous PPRC, the apparatus and methods may also be applicable, in various forms, to PPRC Extended Distance, Asynchronous PPRC, Global Mirror, or other data replication technologies. The apparatus and methods are also not necessarily limited to data replication technologies (such as PPRC), but may be applicable to any device or system that communicates over a communication link such as a fibre channel communication link. Furthermore, the apparatus and methods are not limited to IBM applications, but may be applicable to any comparable or analogous technology regardless of the manufacturer, product name, or components or component names associated with the technology. Any technology that could benefit from one or more embodiments of the invention is deemed to fall within the scope of the invention. Thus, "synchronous" PPRC is presented only by way of example and is not intended to be limiting.

Figure 2:
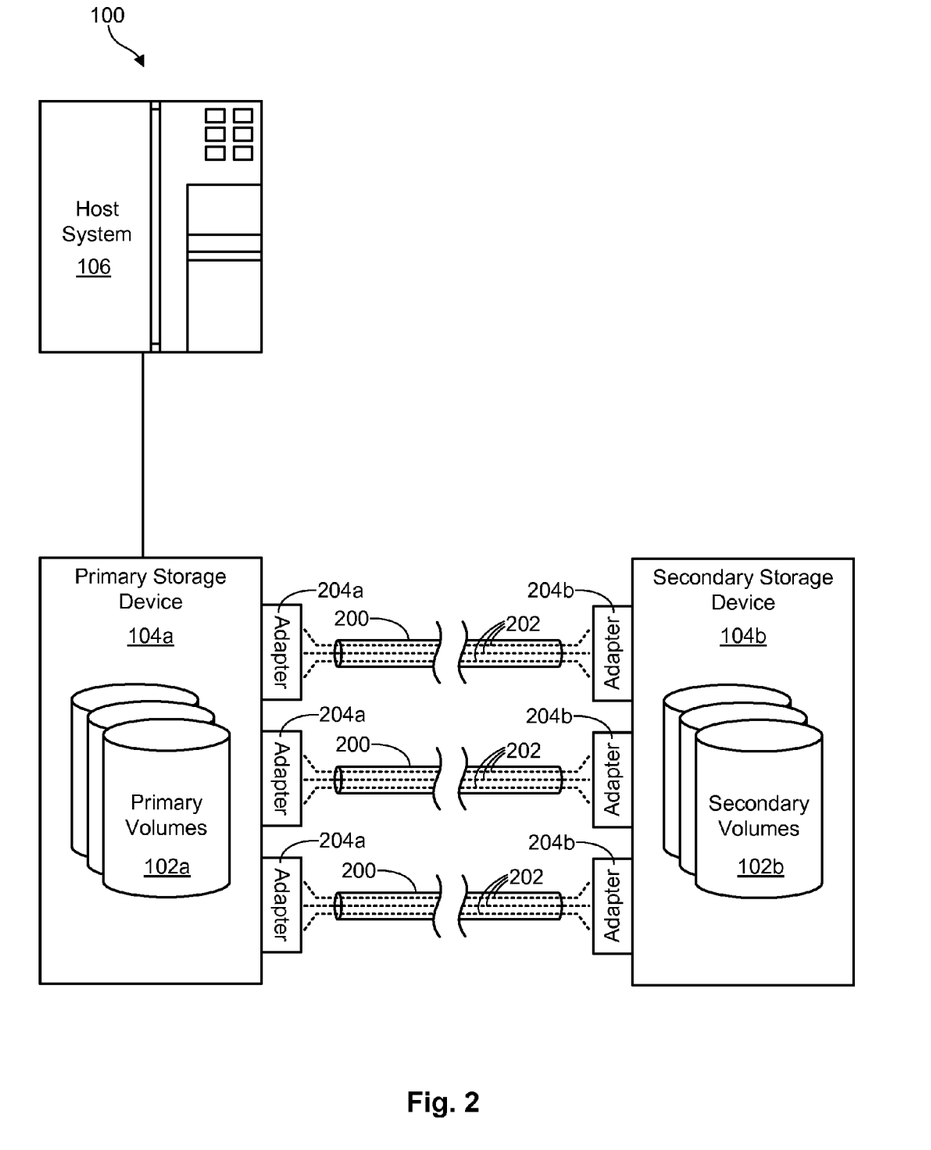
FIG. 2 is a high-level block diagram showing the primary and secondary storage devices configured to communicate over various physical and logical paths.

Referring to FIG. 2, in selected embodiments, the primary and secondary storage devices 104a, 104b may be configured to communicate over multiple paths to provide redundancy. Thus if one path fails, the storage devices 104a, 104b may be able to communicate over another path. A path may be defined as either a physical path 200, which includes the physical transmission media (e.g., links, ports, adapter cards, switch ports, etc.) that the signal travels over, or a logical path 202 which represents the logical connection between volumes 102a, 102b on the primary and secondary storage devices 104a, 104b. For illustration purposes, the physical paths 200 are indicated by the cylindrical shapes 200 and the logical paths 202 are indicated by the dotted lines 202 within the cylindrical shapes 200. As shown, one or more logical paths 202 may travel over the same physical path 200. An application may have no concept of physical paths 200 but instead may communicate using logical paths 202. The paths 200, 202 may include an adapter 204 on each end, in this example a primary adapter 204a and secondary adapter 204b. The primary adapter 204a may connect the primary storage device 104a to a path 200, 202 and the secondary adapter 204b may connect the secondary storage device 104b to a path 200, 202.

The paths 200, 202 may be point-to-point paths 200, 202 or may travel over a network such as a storage-area-network (SAN) fabric, local-area-network (LAN), or wide-area-network (WAN). Similarly, the paths 200, 202 may be converted or mapped into various different communication protocols. For example, the paths 200, 202 may initially be fibre channel paths that are mapped into IP (fibre channel encapsulated in IP packets) for transmission over a network, and then mapped back into the fibre channel protocol. In certain embodiments, channel extenders may be used to perform such mapping. Ideally, the paths 200, 202 will use different physical mediums to travel between the primary and secondary storage devices 104a, 104b to provide a desired amount of redundancy.

Figure 3:
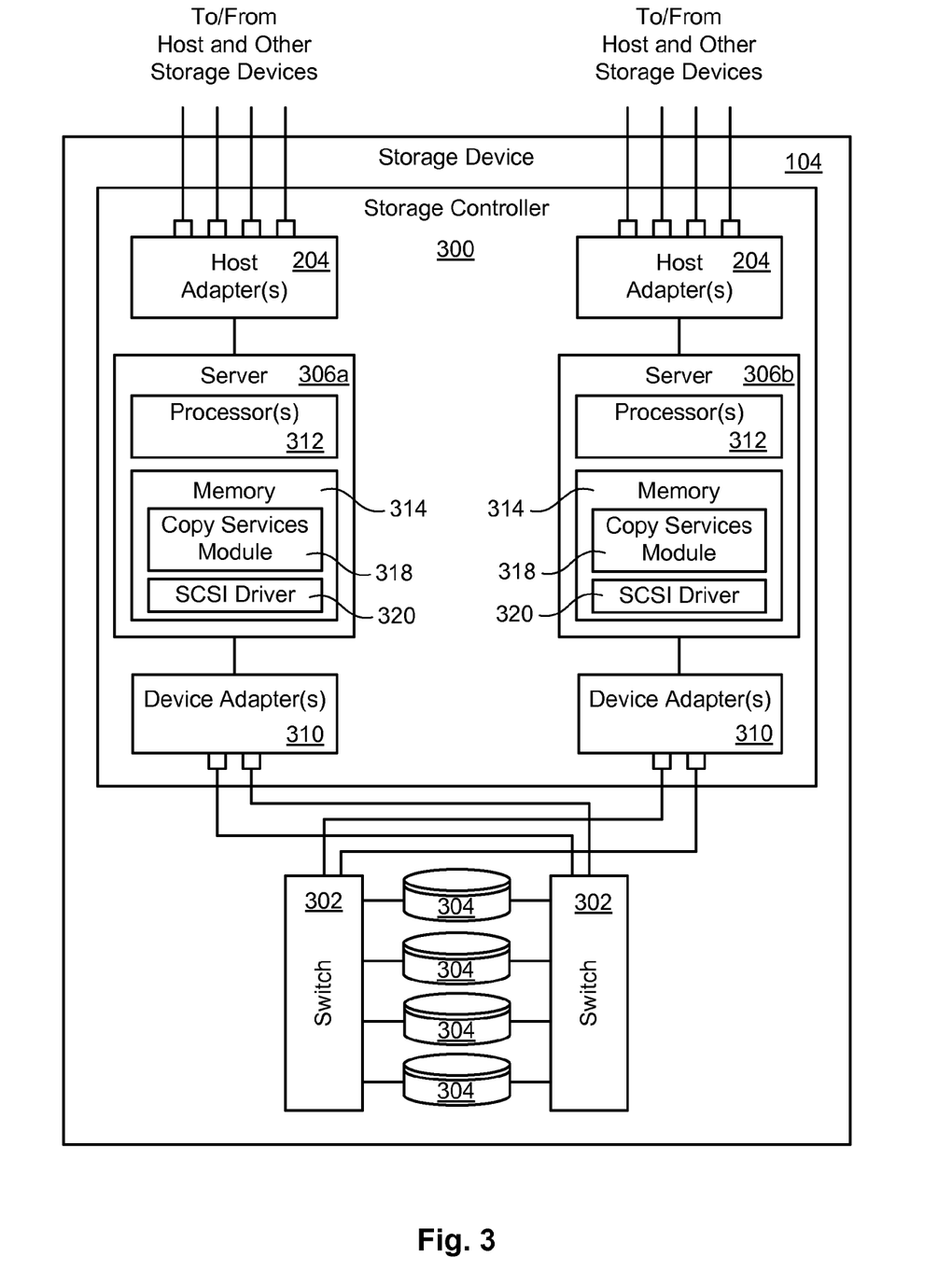
FIG. 3 is a high-level block diagram showing one example of a storage device.

Referring to FIG. 3, one embodiment of a storage device 104 (such as the primary or secondary storage device 104a, 104b) is illustrated. This storage device 104 is provided only by way of example and is not intended to be limiting. In this example, the storage device 104 contains an array of hard-disk drives 304 and/or solid-state drives 304. As shown, the storage device 104 includes a storage controller 300, one or more switches 302, and storage media 304 such as hard-disk drives 304 or solid-state drives 304. The storage controller 300 may enable one or more hosts 106 (e.g., open system and/or mainframe servers 106) or storage devices 104 to access data in the storage media 304.

In selected embodiments, the storage controller 300 includes one or more servers 306. The storage controller 300 may also include host adapters 204 (also referred to as primary and secondary adapters 204a, 204b herein) to connect to host systems 106 and storage devices 104. The storage controller 300 may also include device adapters 310 to connect to the storage media 304. Multiple servers 306a, 306b may provide redundancy to ensure that data is always available to connected hosts. Thus, when one server 306a fails, the other server 306b may remain functional to ensure that I/O is able to continue between the hosts 106 and the storage media 304. This process may be referred to as a "failover." One example of a storage device 104 having an architecture similar to that illustrated in FIG. 3 is the IBM DS8000™ enterprise storage system.

Nevertheless, embodiments of the invention are not limited to being implemented in the IBM DS8000™ enterprise storage system, but may be implemented in any comparable or analogous storage system 104, regardless of the manufacturer, product name, or components or component names associated with the system. Furthermore, any system 104 that could benefit from one or more embodiments of the invention is deemed to fall within the scope of the invention. Thus, the IBM DS8000™ is presented only by way of example and is not intended to be limiting.

In selected embodiments, each server 306 may include one or more processors 312 (e.g., n-way symmetric multiprocessors) and memory 314. The memory 314 may include volatile memory (e.g., RAM) as well as non-volatile memory (e.g., ROM, EPROM, EEPROM, hard disks, flash memory, etc.). The memory 314 may store software modules that run on the processor(s) 312 and are used to access data in the storage media 304. The servers 306 may host at least one instance of these software modules, which collectively may also be referred to as a "server," albeit in software form. These software modules may manage all read and write requests to logical volumes in the storage media 304.

Assuming the storage device 104 is the primary storage device 104a, the memory 314 may also store a copy services module 318 to implement the PPRC functionality described herein. To provide this PPRC functionality, the copy services module 318 may intercept write requests (and associated data) that are sent from the host system 106 to the primary storage device 104a. In addition to executing the write request on the primary storage device 104a, the copy services module 318 may send the write request and associated data to the secondary storage device 104b in order to mirror the data thereto. In order to accomplish this, the copy services module 318 may pass the write request to a SCSI driver 320. The SCSI driver 320 may, in turn, retrieve a list of available paths 202 (between the primary and secondary storage devices 104a, 104b) from the copy services module 318 and transmit the write request over one of these paths 202. In certain embodiments, the SCSI driver 320 may try each path 202 in the list in order (i.e., a "round robin" approach) to balance the workload over the paths 202. For example, the SCSI driver 320 may attempt to send a first write request and data over a first path 202 in the list, and send the next write request and data over the next path 202 in the list, and so forth, in order to balance the workload over all the available paths 202. Other workload balancing algorithms are also possible and within the scope of the invention.

Once a path 202 is determined, the SCSI driver 320 may send the write request to the adapter 204a associated with the path 202. The adapter 204a may then proceed to send the write request over the path 202 or reject the write request if the path is not available or not working correctly. If the adapter 204a rejects the request, the SCSI driver 320 may attempt to send the request down the next available path 202 in the list. This may be accomplished by sending the write request to the adapter 204a associated with the next path 202. This adapter 204a may then proceed to process or reject this request in the manner previously described.

As previously mentioned, when transferring data on a path 202 between the primary and secondary storage devices 104a, 104b, problems may occur that may cause a data transfer to time out. These timeouts may be the result of transient failures or more persistent failures. These timeouts can cause severe performance impacts on a host system 106 since the I/O is not complete until the I/O has successfully completed on both the primary and secondary storage devices 104a, 104b. Consequently a self-healing solution is needed to not only stop sending I/O down a path 202 that is experiencing failures, but also determine whether the failures are transient in nature. This solution would also ideally resume sending normal I/O on the path 202 when the path 202 is functioning correctly. Each of these steps would ideally be performed without user invention.

Figure 4:
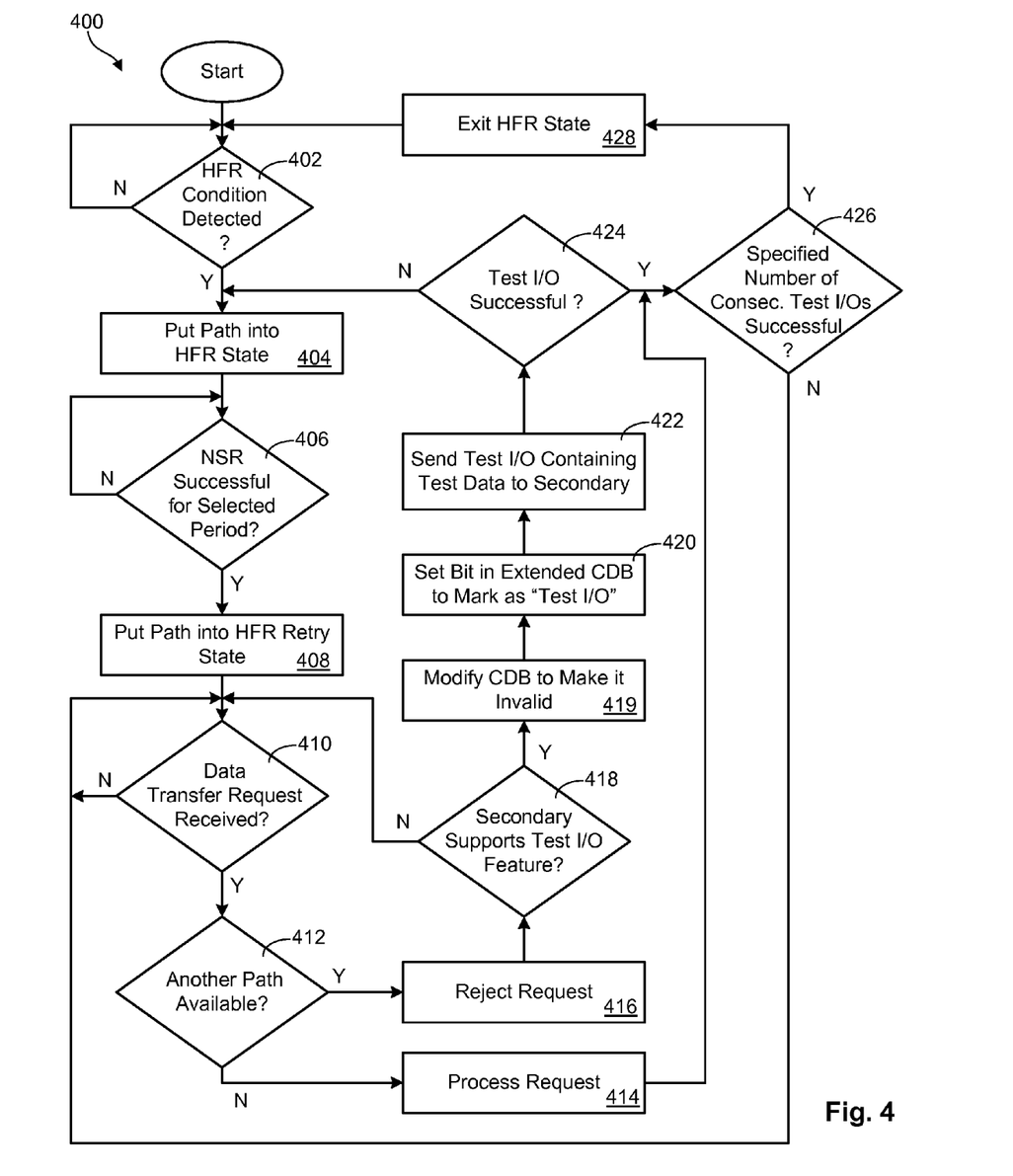
FIG. 4 is a flow chart showing one embodiment of a method for verifying the integrity of a communication link from the perspective of a primary adapter.

Referring to FIG. 4, in selected embodiments, a method 400 in accordance with the invention may be used to verify the integrity of a path 202 after it has experienced one or more failures. This method 400 may be executed in the adapter 204 (more specifically the primary adapter 204a) connected to the path 202, although the method 400 is not necessarily limited to execution within the adapter 204. It should also be noted that the method 400 works at the logical path level, although it may also be configured to work at the physical path level, as will be explained in more detail hereafter.

In certain embodiments, the method 400 may begin by monitoring the path 202 to detect 402 high-failure-rate (HFR) conditions on the path 202. Any number of algorithms may be used to detect 402 such an HFR condition. For example, one or more of the following may be used to determine 402 whether an HFR condition exists on the path 202: (1) there are sixteen I/O timeouts on the path 202 within an interval of five minutes; (2) there are I/O timeouts in any sixteen one-second time slots within an interval of four hours; and (3) there are I/O timeouts in any three one-minute time slots within an interval of five minutes. These represent just a few examples of criteria that may be used to determine 402 whether an HFR condition exists on the path 202 and are not intended to be limiting.

If any of the designated criteria are satisfied, the adapter 204a may put 404 the path 202 into a high-failure-rate (HFR) state. This state information may be kept internally within the adapter 204a. Thus, the path 202 may appear to be "connected" to external components such as the SCSI driver 320 and copy services module 318 previously described. Thus, the SCSI driver 320 will continue to try to use the path 202 to transmit write requests to the secondary storage device 104b.

Once in "HFR state," the adapter 204a may perform preliminary testing on the path 202 to determine the severity of the failure condition and determine if conditions on the path 202 are suitable for more rigorous testing. For example, in selected embodiments, the adapter 204a may periodically send a SCSI command (such as a "non-specific read" command, or "NSR" command) on the path 202 every few seconds (e.g., every four seconds). The secondary adapter 204b may use the NSR command to send messages back to the primary adapter 204a if needed. If these NSR commands are successfully transmitted over the path 202 for a selected period of time (as indicated at step 406), the adapter 204a may put 408 the path 202 into "HFR retry state." In "HFR retry state", the path 202 may be put through more rigorous testing to determine if the path 202 is suitable for transmitting real commands and data.

For example, in HFR retry state, each time the adapter 204a receives 410 an I/O request (e.g., a write request) from the SCSI driver 320, the adapter 204a may initially determine 412 whether another path is available. This may be accomplished by examining the I/O request (the SCSI driver 320 may indicate in the I/O request whether another path 202 is available since the adapter 204a may only be aware of its own paths). If another path is not available, the adapter 204a may simply process 414 the request by transmitting the I/O request and associated data over the path 202 since another more suitable path is not available. Thus, even when a path 202 is in "HFR state" or "HFR retry state", the adapter 204a may still transmit I/O commands and data over the path 202 if another path is not available.

On the other hand, if another path is available, the adapter 204a may reject 416 the I/O request from the SCSI driver 320. This will allow the SCSI driver 320 to try to send the I/O request down the next path 202 in the list. Once the adapter 204a rejects 416 the request, the adapter 204a may then determine 418 whether the secondary adapter 204b connected to the path 202 supports a test I/O feature. This step 418 may be accomplished using the method 700 disclosed in FIG. 7. If the secondary adapter 204b supports the test I/O feature, the primary adapter 204a may proceed to generate a test I/O command (steps 419, 420, 422). In doing so, the primary adapter 204a may optionally modify 419 the command descriptor block (CDB) of the SCSI command to make the command invalid (e.g., by inserting an invalid volume ID or doing something that makes the command illegal). This will ensure that the secondary adapter 204b discards the I/O command (since it is intended as a test I/O command and not a real I/O command) instead of processing it. The primary adapter 204a may also set 420 a bit in the extended CDB (i.e., the extended vendor-specific portion of the CDB) as "Test I/O" to indicate that the I/O command is for testing purposes and should not be actually written to the secondary storage device 104b.

Once the test I/O command is complete, the primary adapter 204a may send 422 the test I/O to the secondary adapter 204b. In doing so, the primary adapter 204a may populate the test I/O with test data (i.e., fake data). This test data may be stored in a buffer within the primary adapter 204a. The test data is used to ensure that data can be transmitted in an error-free manner over the path 202. Once received by the secondary adapter 204b, the test data may be discarded along with the test I/O command. The use of test data (as opposed to real data) is advantageous in that it reduces the need to perform DMA operations to bring real data into the adapter 204a.

After the test I/O command and data are sent, the primary adapter 204a may determine 424 whether the test I/O and associated data were successfully received by the secondary adapter 204b. This may be accomplished, for example, by receiving an acknowledgement signal from the secondary adapter 204b indicating that the test I/O and data were successfully received. If the test I/O did not complete 424 successfully (e.g., the primary adapter 204a received an "abort" command from the secondary adapter 204b or a timeout occurred on the primary adapter 204a), the primary adapter 204a may start over by putting 404 the path 202 into HFR state. On the other hand, if the test I/O did complete 424 successfully (e.g., the primary adapter 204a received an acknowledgement signal from the secondary adapter 204b), the primary adapter 204a may determine 426 whether a specified number (e.g., 150,000) of test I/Os (which may also include real I/Os where another path is not available) have successfully completed over the path 202. This may be accomplished by counting the number of consecutive test I/Os successfully transmitted over the path 202. The number of consecutive test I/Os may be a single block or be derived from multiple blocks (e.g., four blocks of 50,000 consecutive test I/Os). These numbers are provided only as examples and may be adjusted as needed.

Once a specified number of consecutive test I/Os have been successfully completed over the path 202, the path 202 may exit 428 HFR state. Upon exiting HFR state, the primary adapter 204a will stop transmitting test I/Os over path 202 and resume transmitting real commands and data over the path 202. In other words, upon exiting HFR state, the primary adapter 204a will process I/O requests from the SCSI driver 320 instead of rejecting such requests.

One notable feature of the method 400 is that when a path 202 is in "HFR retry state", the primary adapter 204a will send a test I/O to the secondary adapter 204b for every real I/O request received by the primary adapter 204a. In other words, the primary adapter 204a will send an amount of test I/O down the path 202 that corresponds to the amount of real commands and data that a customer would normally send down the path 202. This allows the testing scheme to be tailored to a particular customer's data transmission requirements and will reduce the chance that the primary adapter 204a will overdrive the path 202. This will also ensure that a path 202 exits HFR state when it is able to successfully transmit the amount of data required by the customer.

As previously mentioned, the method 400 may be configured to function at either the logical or physical path level. One advantage of applying the method 400 at the logical path level is that if one logical path 202 fails and enters HFR state, other logical paths 202 on the same physical path 200 may continue to operate normally (assuming that the problem is with the logical path 202 and not the physical path 200). Thus, for the same physical path 200, some logical paths 202 may be in HFR state while others may be in a normal operating state. On the other hand, one advantage of applying the method 400 at the physical path level is that if a problem occurs on the physical path 200, the physical path 200 may be put into HFR state without requiring each logical path 202 traveling over the physical path 200 to be put into HFR state individually. Thus, each approach has its advantages and disadvantages. Other advantages and disadvantages may also exist that are not mentioned here.

Figure 5:
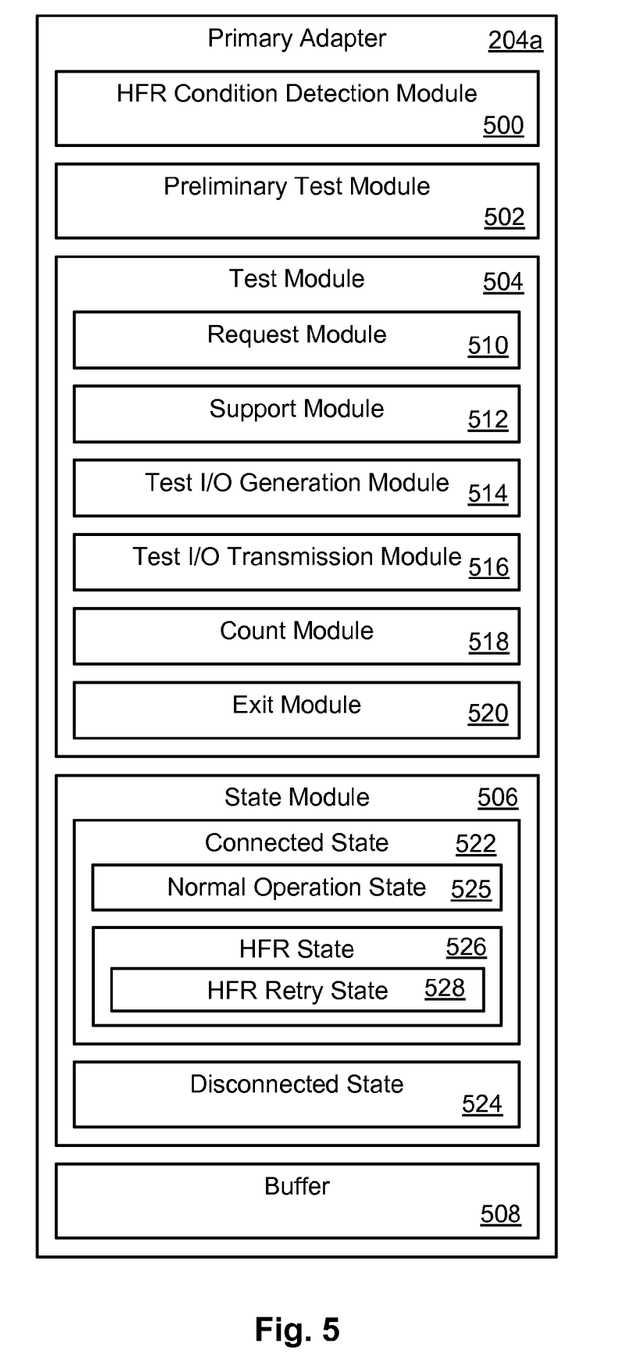
FIG. 5 is a high-level block diagram showing various modules that may be included in the primary adapter to perform the method illustrated in FIG. 4.

Referring to FIG. 5, at a very high level, a primary adapter 204a (or other system or apparatus) may include one or more modules to implement the functionality described in FIG. 4. These modules may be embodied in hardware, software configured to operate hardware, firmware configured to operate hardware, or a combination thereof. In selected embodiments, these modules may include one or more of an HFR condition detection module 500, a preliminary test module 502, a test module 504, and a state module 506. The adapter 204a may also include a buffer 508 to store test data to populate the test I/O transmitted between the primary and secondary storage devices 104a, 104b.

An HFR condition detection module 500 may be used to detect a high-failure-rate (HFR) condition on the path 202. The HFR condition detection module 500 may use any number of algorithms to detect such a condition. For example, the HFR condition detection module 500 may determine that an HFR condition exists on the path 202 if a certain number of I/O timeouts occur on the path within a certain interval of time, or a number of I/O timeouts occur in a number of time slots within a selected interval of time. These represent just a few examples and are not intended to be limiting.

If an HFR condition is detected on a path 202 by the HFR condition detection module 500, a state module 506 may put the path in an HFR state 526. As previously mentioned, the HFR state 526 may still be considered a connected state 522, but may be degraded to a point that it is only used for communications as a last resort. This may differ from a disconnected state 524, which means that a path 202 is entirely unusable or not connected. A path 202 may be put in a disconnected state 524 if enough failures or errors occur that make the path 202 unusable.

A preliminary test module 502 may be used to perform preliminary tests on the path 202 to determine the severity of the failure condition and determine if the path 202 is suitable for more rigorous testing. For example, the preliminary test module 502 may periodically send an NSR command on the path 202 and determine if the transmission completed successfully. If the NSR commands are successful for a selected period of time, the state module 506 may put the path 202 into "HFR retry state" 528, which may be a sub-state of "HFR state" 526. Like "HFR state" 526, a path 202 in "HFR retry state" 528 may be connected but degraded such that it is only used as a last resort.

In "HFR retry state" 528, a test module 504 may put the path 202 through more rigorous testing to determine if the path 202 is suitable for transmitting real commands and data. In selected embodiments, the test module 504 may include one or more of a request module 510, a support module 512, a test I/O generation module 514, a test I/O transmission module 516, a count module 518, and an exit module 520.

Upon receiving an I/O request from the SCSI driver 320, the request module 510 may initially determine whether another path is available. If another path is not available, the request module 510 may be configured to process the request by transmitting the I/O request and associated data over the path 202. On the other hand, if another path is available, the request module 510 may be configured to reject the I/O request from the SCSI driver 320. This will allow the SCSI driver 320 to re-drive the I/O request down another more suitable path 202.

If the request module 510 rejects the I/O request, a support module 512 may determine whether the secondary adapter 204b connected to the path 202 supports a test I/O feature. If the secondary adapter 204b supports the test I/O feature, a test I/O generation module 514 may generate a test I/O command. In doing so, the test I/O generation module 514 may optionally modify the command descriptor block (CDB) of the I/O command to make the command invalid and set a bit in the extended CDB of the command to mark the command as "Test I/O." Once the test I/O is complete, a test I/O transmission module 516 may send the test I/O, populated with test data from the buffer 508, to the secondary adapter 204b.

A count module 518 may count the number of consecutive test I/Os that are successfully transmitted to the secondary adapter 204b. Once the count has reached a specified number, an exit module 520 may cause the path 202 to exit HFR state 526. Upon exiting HFR state 526, the state module 506 may put the path 202 in a normal operating state 525, thereby allowing real commands and data to once again be transmitted over the path 202. If the count does not reach a specified number without encountering a failure or error, the path 202 may stay in "HFR state" 526.

Figure 6:
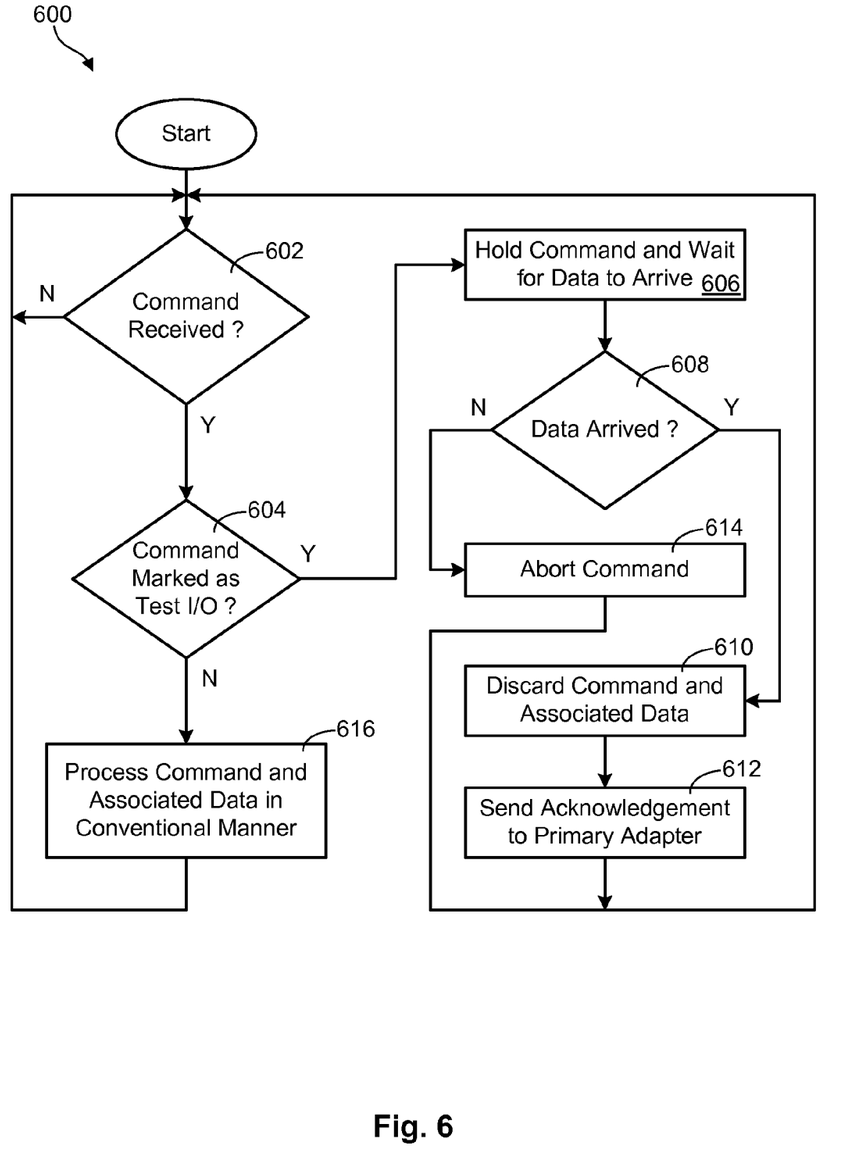
FIG. 6 is a flow chart showing one embodiment of a method for verifying the integrity of a communication link from the perspective of a secondary adapter.

Referring to FIG. 6, a method 600 in accordance with the invention may be performed by the secondary adapter 204b, although it is not limited to being performed by the secondary adapter 204b. In certain embodiments, if the secondary adapter 204b connected to a path 202 is configured to support test I/O, the secondary adapter 204b may initially determine 602 whether an I/O command has been received. If a command has been received, the secondary adapter 204b may determine 604 whether the command is marked as test I/O. If the command is not marked as test I/O and the command is valid, the command and associated data will be processed 616 in the conventional manner. That is, data associated with the command will be written to the secondary storage device 104b in the conventional manner and an acknowledgement of the write will be sent back to the primary adapter 204a.

On the other hand, if the command is marked as test I/O, the secondary adapter 204b will hold 606 the command, optionally notify the primary adapter 204a that it is ready to receive data, and then wait 606 for the data associated with the command to arrive (i.e., the command and data may arrive in separate frames). If the data arrives 608 successfully, the secondary adapter 204b will discard 610 the command and associated data and send 612 an acknowledgement signal back to the primary adapter 204a. This will notify the primary adapter 204 that the command and data has arrived successfully. On the other hand, if the data does not arrive 608 (thereby generating a timeout in the secondary adapter 204b) or the data arrives with errors, the secondary adapter 204b will abort 614 the command and notify the primary adapter 204a that the command was aborted. The primary adapter 204a will then know that an error or failure has occurred on the path 202 and will be able to take appropriate action, such as by remaining in HFR state and resetting the counter.

Figure 7:
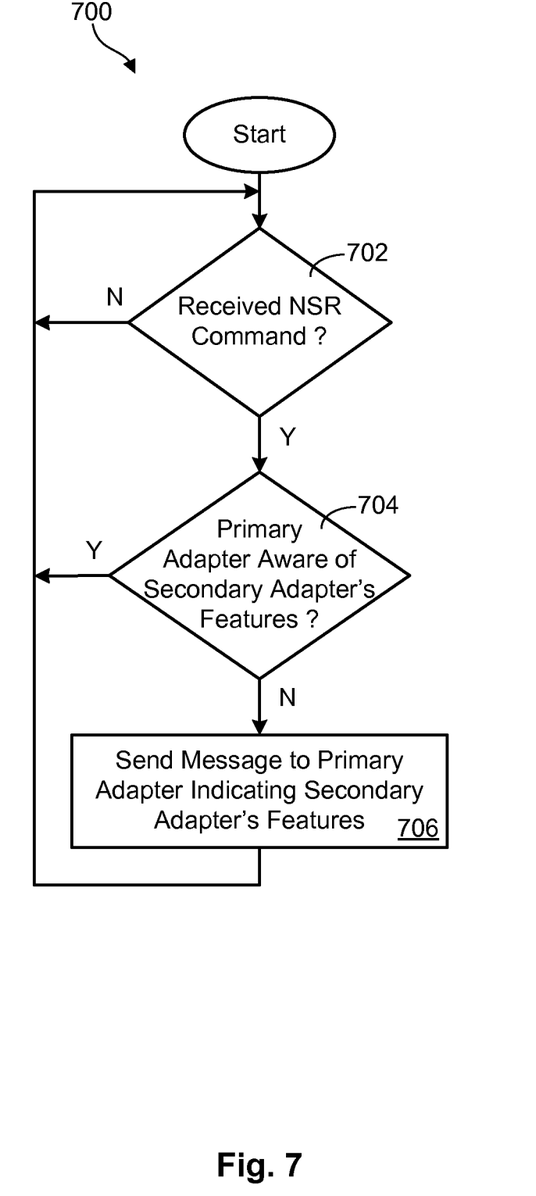
FIG. 7 is a flow chart showing one embodiment of a method for verifying that a secondary adapter is able to support the method illustrated in FIG. 4.

Referring to FIG. 7, in selected embodiments, a method 700 may be executed by the secondary adapter 204b so that the primary adapter 204a knows whether the secondary adapter 204b supports test I/O. As previously mentioned, the primary adapter 204a may periodically send NSR commands to the secondary adapter 204b over a path 202. This may occur regardless of whether the path 202 is in HFR state or not. The NSR command may store information regarding what the primary adapter 204a knows about the features of the secondary adapter 204b, including whether the secondary adapter 204b supports the test I/O feature. Upon receiving 702 an NSR command, the secondary adapter 204b may inspect the NSR command. If the primary adapter 204a is aware 704 of the secondary adapter's test I/O feature, the secondary adapter will respond to the NSR command in the conventional manner. However, if the primary adapter 204a is not aware of the secondary adapter's test I/O feature, the secondary adapter 204b may send 706 a message to the primary adapter indicating the secondary adapter's features.

Figure 8:
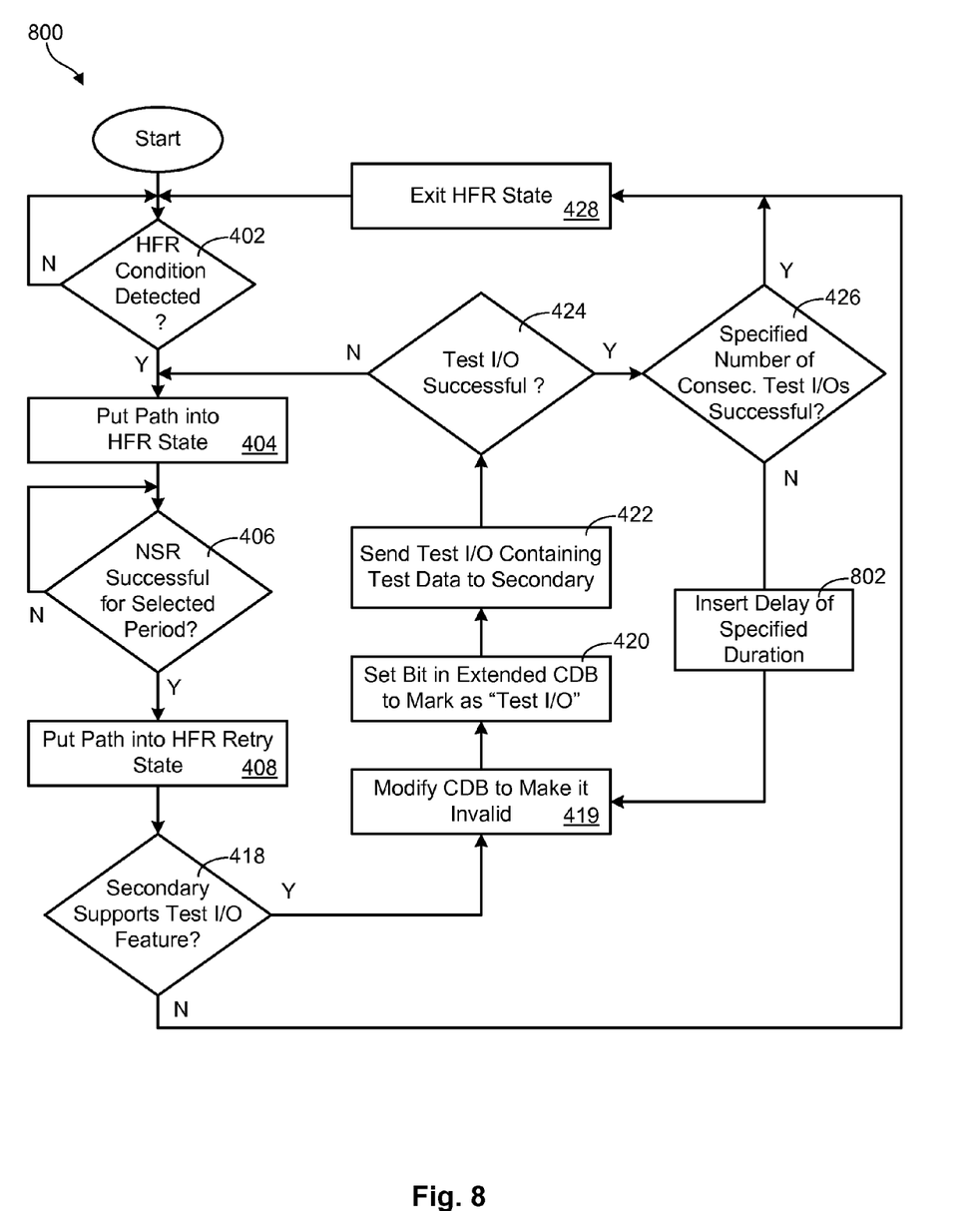
FIG. 8 is a flow chart showing an alternative embodiment of a method for verifying the integrity of a communication link, from the perspective of the primary adapter.

Referring to FIG. 8, one alternative embodiment of the method 400 described in FIG. 4 is illustrated. The method 800 illustrated in FIG. 8 is similar to that described in FIG. 4 except that the primary adapter 204a does not rely on requests from the SCSI driver 320 to generate test I/Os. In this embodiment, the primary adapter 204a generates test I/Os and sends them to the secondary adapter 204b at some specified data rate. The data rate may be determined by inserting 802 a delay of specified duration after each test I/O has been transmitted over the path 202. The data rate may be adjusted by simply adjusting the delay. In certain embodiments, the delay may be set with a duration so as not to overdrive the path 202 and thereby cause additional errors or failures. In certain embodiments, the data rate may be set to reflect an average data rate required by a customer during normal operation. When a selected number of consecutive test I/Os have been successfully transmitted over a path 202 (as determined at step 426), the primary adapter 204a associated with the path 202 may exit 428 HFR state and resume normal operation on the path 202.

Figure 9:
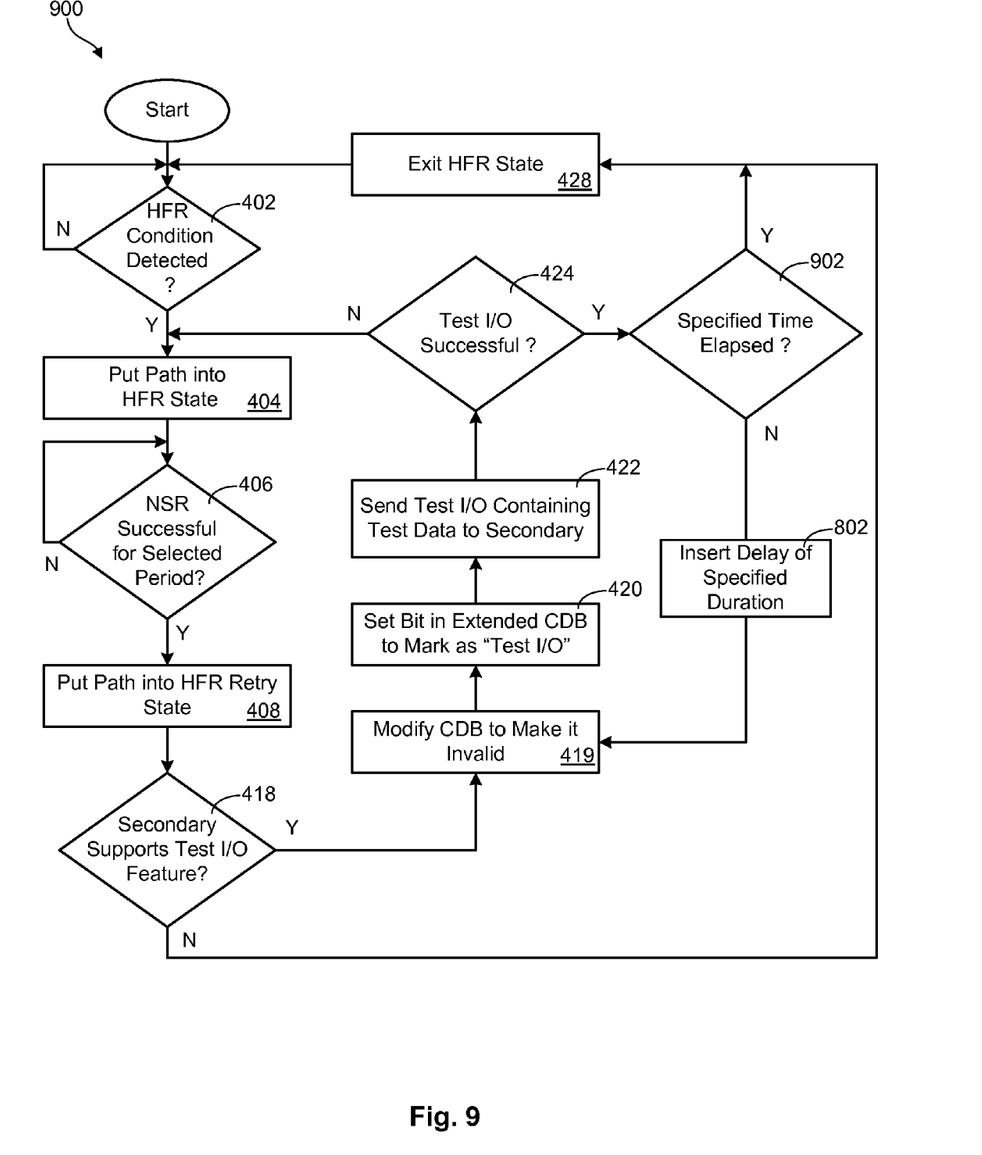
FIG. 9 is a flow chart showing yet another embodiment of a method for verifying the integrity of a communication link, from the perspective of the primary adapter.

Referring to FIG. 9, another embodiment of the method 400 described in FIG. 4 is illustrated. This method 900 is similar to that described in FIG. 8 except that the primary adapter 204a does not count the number of consecutive test I/Os but rather sends test I/Os over the path 202 for a selected period of time. The period of time may be a continuous period of time or may be multiple blocks of time or intervals. If the test I/Os are successfully transmitted for the specified period of time (as determined at step 902), the primary adapter 204a exits HFR state and resumes normal operation. Like the previous example, when in HFR retry state, the primary adapter 204a generates test I/Os and sends them to the secondary adapter at some specified data rate. The test I/Os may be sent either one at a time or concurrently. The data rate may be set by inserting 802 a delay of specified duration between each test I/O or between each group of concurrent test I/Os. The data rate may be adjusted by adjusting the duration of the delay. Like the previous example, the duration of the delay may be set to not overdrive the path 202 and may reflect a data rate required by a customer.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for verifying the integrity of a communication link, the method comprising,
   detecting, during normal operation of a communication link, a condition indicative of a high failure rate (HFR) on the communication link;
   placing the communication link in an HFR state as a result of the condition, wherein placing the communication link in HFR state comprises suspending transmission of real I/Os over the communication link while the communication link is in HFR state;
   repeatedly transmitting test I/Os over the communication link while the communication link is in HFR state; and
   automatically exiting HFR state and resuming normal operation on the communication link once at least one of the following has occurred: a selected number of test I/Os have been successfully transmitted over the communication link, and a number of test I/Os have been successfully transmitted over the communication link for a selected amount of time.

2. The method of claim 1, wherein repeatedly transmitting test I/Os over the communication link comprises repeatedly performing the following:
generating a test I/O for transmission over the communication link;
marking the test I/O with an indicator indicating that the test I/O is for testing purposes;
sending the test I/O over the communication link; and
waiting for an acknowledgement that the test I/O was successfully transmitted over the communication link.

3. The method of claim 1, wherein repeatedly transmitting test I/Os over the communication link comprises receiving a plurality of real I/Os for transmission over the communication link and, for each real I/O that is received, rejecting the real I/O and transmitting instead a test I/O over the communication link.

4. The method of claim 1, wherein repeatedly transmitting test I/Os over the communication link comprises rejecting real I/Os that would normally be transmitted over the communication link.

5. The method of claim 1, wherein the test I/Os contain test data as opposed to real data.

6. The method of claim 1, wherein, prior to repeatedly transmitting test I/Os over the communication link, a preliminary test is performed on the communication link to determine if conditions on the communication link are suitable for transmitting the test I/Os.

7. The method of claim 1, wherein transmitting test I/Os over the communication link comprises transmitting the test I/Os over the communication link at a rate that is substantially the same as a customer's transmission rate.

8. The method of claim 1, wherein the selected number of test I/Os are a selected number of consecutive test I/Os.

9. A system for verifying the integrity of a communication link, the system comprising,
a first adapter to detect, during normal operation of a communication link, a condition indicative of a high failure rate (HFR) on the communication link;
the first adapter further configured to place the communication link in an HFR state as a result of the condition, wherein placing the communication link in HFR state comprises suspending transmission of real I/Os over the communication link while the communication link is in HFR state;
the first adapter further configured to repeatedly transmit test I/Os to a second adapter over the communication link while the communication link is in HFR state; and
the first adapter further configured to automatically exit HFR state and resume normal operation on the communication link once at least one of the following has occurred: a selected number of test I/Os have been successfully transmitted over the communication link, and a number of test I/Os have been successfully transmitted over the communication link for a selected amount of time.

10. The system of claim 9, wherein the first adapter is configured to repeatedly perform the following:
generate a test I/O for transmission over the communication link;
mark the test I/O with an indicator indicating that the test I/O is for testing purposes;
send the test I/O to the second adapter over the communication link; and
wait for an acknowledgement from the second adapter that the test I/O was successfully transmitted over the communication link.

11. The system of claim 9, wherein the first adapter is further configured to transmit a test I/O over the communication link for each real I/O received for transmission over the communication link.

12. The system of claim 9, wherein the test I/Os contain test data as opposed to real data.

13. The system of claim 9, wherein the first adapter is further configured to perform a preliminary test on the communication link to determine if conditions on the communication link are suitable for transmitting the test I/Os.

14. The system of claim 9, wherein the first adapter is configured to transmit the test I/Os over the communication link at a rate that is substantially the same as a customer's transmission rate.

15. The system of claim 9, wherein the selected number of test I/Os are a selected number of consecutive test I/Os.

16. An apparatus for verifying the integrity of a communication link, the apparatus comprising,
a detection module to detect, during normal operation of a communication link, a condition indicative of a high failure rate (HFR) on the communication link;
a state module to place the communication link in an HFR state as a result of the condition, wherein placing the communication link in HFR state comprises suspending transmission of real I/Os over the communication link while the communication link is in HFR state;
a test module to repeatedly transmit test I/Os over the communication link while the communication link is in HFR state; and
an exit module configured to automatically exit HFR state and resume normal operation once at least one of the following has occurred: a selected number of test I/Os have been successfully transmitted over the communication link, and a number of test I/Os have been successfully transmitted over the communication link for a selected amount of time.

17. The apparatus of claim 16, wherein the test module is configured to repeatedly perform the following:
generate a test I/O for transmission over the communication link;
mark the test I/O with an indicator indicating that the test I/O is for testing purposes;
send the test I/O over the communication link; and
wait for an acknowledgement that the test I/O was successfully transmitted over the communication link.

18. The apparatus of claim 16, wherein the test module is further configured to transmit a test I/O over the communication link for each real I/O received for communication over the communication link.

19. The apparatus of claim 16, wherein the test I/Os contain test data as opposed to real data.

20. The apparatus of claim 16, wherein the test module is configured to transmit the test I/Os over the communication link at a rate that is substantially the same as a customer's transmission rate.

* * * * *